US005165843A

United States Patent [19]

Hendriks et al.

[11] Patent Number: 5,165,843

[45] Date of Patent: Nov. 24, 1992

[54] METHOD FOR TRANSPORTING A STACK OF TURF SODS

[75] Inventors: Johnannes G. M. Hendriks, Heythuysen; Mathias M. G. Hendriks, Haelen; Wilhelmus J. P. Hendriks, Heythuysen, all of Netherlands

[73] Assignee: Gebr. Hendriks VOF Research, Heythuysen, Netherlands

[21] Appl. No.: 559,412

[22] Filed: Jul. 24, 1990

Related U.S. Application Data

[63] Continuation of Ser. No. 278,276, Nov. 30, 1988, abandoned.

[30] Foreign Application Priority Data

Dec. 2, 1987 [NL] Netherlands ........................ 8702893

[51] Int. Cl.[5] ........................................ B65G 57/24

[52] U.S. Cl. ........................................ 414/786; 172/19; 414/792; 414/911

[58] Field of Search ................ 56/DIG. 13; 111/100, 111/901; 172/19, 20; 414/24.5, 786, 791.5, 792.5, 792, 792.4, 911, 721, 789.7

[56] References Cited

U.S. PATENT DOCUMENTS

| | | | |
|---|---|---|---|
| 3,208,612 | 9/1965 | Blair | 414/721 |
| 3,698,534 | 10/1972 | Hadfield | 414/789.7 X |
| 3,715,045 | 2/1973 | Shawcroft | 414/721 X |
| 3,931,899 | 1/1976 | McAlhaney | 414/789.7 X |
| 4,032,184 | 6/1977 | Blair | 414/24.5 X |
| 4,268,210 | 5/1981 | Ferguson et al. | 414/417 X |
| 4,295,772 | 10/1981 | Zimmerman | 414/791.5 X |
| 4,537,549 | 8/1985 | Knels | 414/24.5 |
| 4,777,890 | 10/1988 | Raymond | 414/911 X |

FOREIGN PATENT DOCUMENTS

| | | | |
|---|---|---|---|
| 1197588 | 12/1985 | U.S.S.R. | 414/792.5 |

*Primary Examiner*—Michael S. Huppert
*Assistant Examiner*—Janice Krizek
*Attorney, Agent, or Firm*—Ladas & Parry

[57] ABSTRACT

The invention relates to a method for transporting a stack of rolled-up turf sods, whereby the rolled-up sods are stacked on top of one another in several layers. Each layer comprises a few rows of rolled-up sods, located side by side, whereby each row consists of a few rolled-up sods, being in line, and the longitudinal axes of the rolled-up sods in the one layer extend transversely to the longitudinal axes of the rolled-up sods in a layer located under and/or above said layer. The stack of rolled-up sods, in order to be transported, is carried by a fork having a number of teeth, whereby the rolled-up sods of the lowermost layer are directly supported by the teeth extending parallel to the longitudinal axes of the rolled-up sods of the lowermost layer, such that each rolled-up sod of the lowermost layer is supported by two teeth located side by side.

4 Claims, 3 Drawing Sheets

METHOD FOR TRANSPORTING A STACK OF TURF SODS

This is a continuation of co-pending application Ser. No. 07/278,276 filed Nov. 30, 1988, now abandoned.

The invention relates to a method for transporting a stack of rolled-up turf sods, whereby the rolled-up sods are stacked on top of one another in several layers, such that each layer comprises a few rows of rolled-up sods, located side by side, whereby each row consists of a few rolled-up sods, being in line, and the longitudinal axes of the rolled-up sods in the one layer extend transversely to the longitudinal axes of the rolled-up sods in a layer located under and/or above said layer.

For laying out and/or repairing lawns and/or grass fields and the like use is frequently made of sods, which have been raised from seed at another location. Such sods are delivered in the shape of rolled-up sods, for which purpose the grass is cut loose from the subsoil and from adjacent strips in the shape of strips and rolled up at the location where the grass has been raised. Such rolls have so far been stacked on pallets in order to be transported, lying on said pallets, to the user and/or a wholesale dealer or the like who eventually delivers the sods to the user.

The use of pallets greatly increases the cost, both when expendable pallets are used and when pallets are used which can be used several times. For many decades such pallets have nevertheless been used for transporting sods.

According to the invention the stack of rolled-up sods, in order to be transported, is carried by a fork having a number of teeth, whereby the rolled-up sods of the lowermost layer are directly supported by the teeth extending parallel to the longitudinal axes of the rolled-up sods of the lowermost layer, such that each rolled-up sod of the lowermost layer is supported by two teeth located side by side.

Surprisingly it has become apparent that by using the method according to the invention a stack of rolled-up sods can be lifted directly by the teeth of a fork fixed to e.g. a fork lift truck or similar vehicle, without this resulting in disadvantageous damage to the rolled-up sods or a disintegration of the stack of rolled-up sods. Consequently a considerably saving on the costs of transport of the rolled-up sods can be achieved.

The invention will be further explained hereinafter with reference to the accompanying figures.

FIG. 1 diagrammatically illustrates a stack of rolled-up sods which can be transported using the method according to the invention, FIG. 2 is a plan view of a first embodiment of a fork which can be used when applying the method according to the invention.

Figure 1:
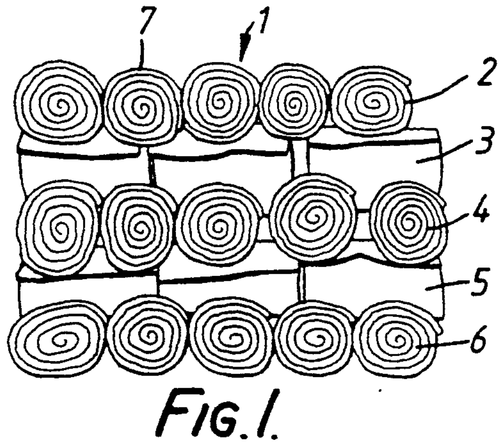

FIG. 1 illustrates a stack of rolled-up sods 1, which stack is built up from several layers 2–6 located above one another. The layers 3 and 5 contain several rolled-up sods 7 located in a row and being in line, the longitudinal axes of said rolled-up sods extending at least substantially parallel to the plane of the drawing, seen in FIG. 1, whilst each layer thereby comprises several rows located behind one another, seen in FIG. 1. The layers 2, 4, and 6 are built up from several rows of rolled-up sods 7 located side by side, the longitudinal axes of which extend at least substantially perpendicularly to the plane of the drawing, seen in FIG. 1, each row comprising at least two rolled-up sods located behind each other.

Figure 2:
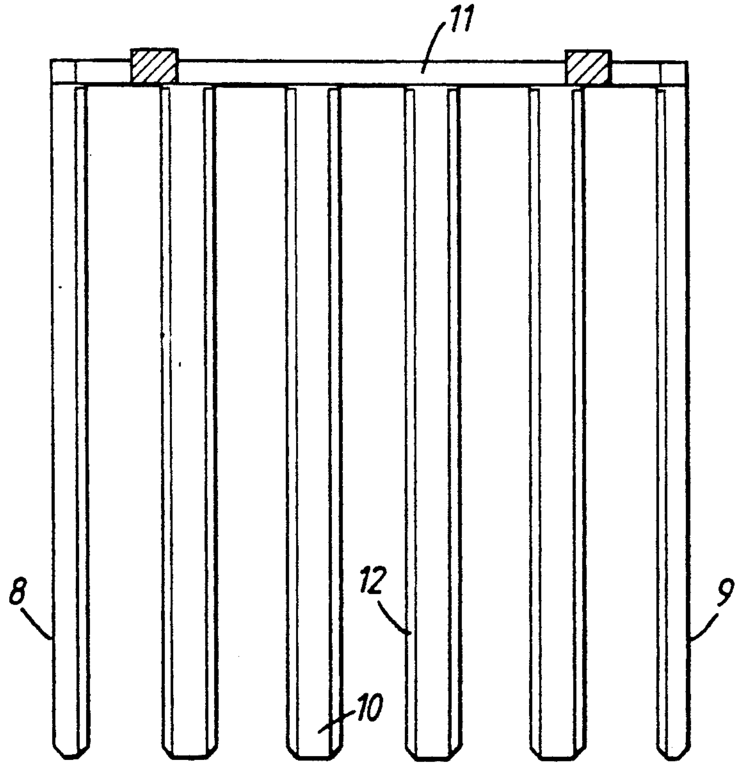
Figure 3:
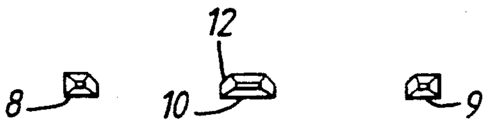
FIG. 3 is a view of the ends of the outermost teeth and a tooth located therebetween of the fork illustrated in FIG. 2.

Such rolled-up sods are usually cut loose from a grass field specially raised for that purpose by means of a machine known by itself, and simultaneously rolled up into rolls. According to the invention said machine is equipped with a fork as illustrated in FIGS. 2 and 3. Said fork comprises a pair of outermost teeth 8 and 9, which are narrower than teeth 10 located therebetween and extending parallel to the teeth 8 and 9. The teeth 8–10 are fixed to a supporting part 11 by means of which the fork is fixed to the sod cutter.

As appears in particular from FIG. 3 the longitudinal edges 12 of the teeth are bevelled, such that at least the upper parts of the sides of the tooth slope downwards in the direction of an adjacent tooth.

When the sods are being cut the rolled-up sods are stacked on the fork illustrated in FIG. 2, such that each set of two teeth located side by side supports a row of rolled-up sods, whereby the longitudinal axes of said rolled-up sods extend parallel to the longitudinal axes of the teeth.

For usual rolled-up sods the centre-to-centre distance between the teeth amounts to 240 mm, whilst the width of the teeth may vary between 40 and 160 mm, preferably lying between 90 and 110 mm.

When a stack of the desired size has been formed on the fork coupled to the sod cutter said stack can be put down on the ground or on another vehicle.

Figure 4:
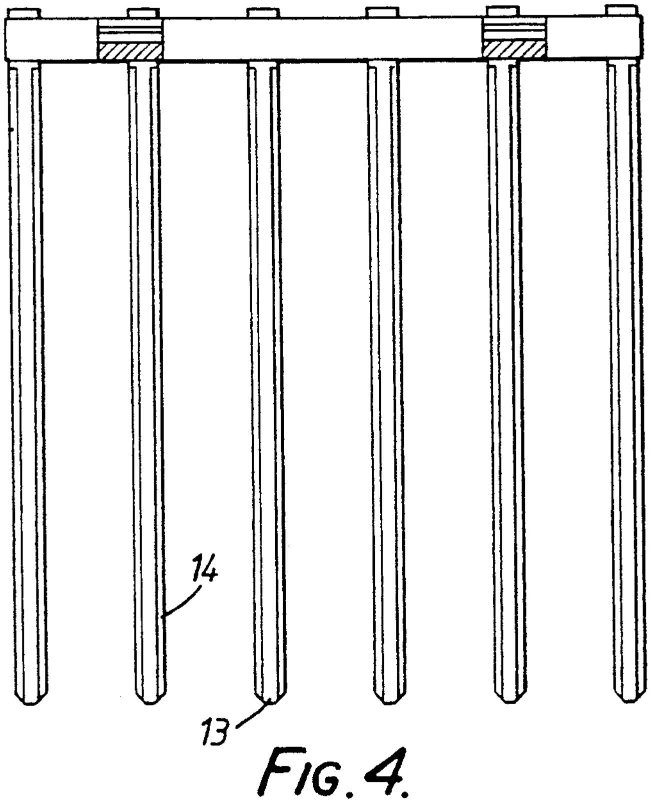
FIG. 4 is a plan view of a second embodiment of a fork which can be used when applying the method according to the invention.
Figure 5:
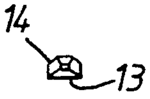
FIG. 5 is a view of the end of a tooth of the fork illustrated in FIG. 4.

When the stack of rolled-up sods needs to be moved, e.g. when loading and/or unloading a wagon transporting the stack of rolled-up sods, use is preferably made of a fork such as illustrated in FIGS. 4 and 5. Said fork is again provided with a number of teeth 13 extending parallel to one another, the centre-to-centre distance of said teeth being at least substantially equal to the centre-to-centre distance of the teeth of the fork illustrated in FIGS. 2 and 3. Furthermore the longitudinal edges 14 of said teeth are again bevelled in a similar manner as the longitudinal edges 12 of the teeth of the fork according to FIGS. 2 and 3, in order to obtain a better support of the rolled-up sods.

As appears in particular from FIG. 5, however, the teeth of said fork are narrower than the teeth of the fork illustrated in FIGS. 2 and 3, whereby the dimensions of the teeth may lie between 40 and 100 mm, preferably between 55 and 65 mm.

The teeth of this fork intended for further transporting purposes are narrower in order to make it possible that the teeth can be easily inserted in the interspaces between the rolled-up sods of the lowermost layer, also in the case that the interspaces between said lowermost rolled-up sods are pressed inwards a little under the influence of the weight of the rolled-up sods lying thereabove.

Figure 6:
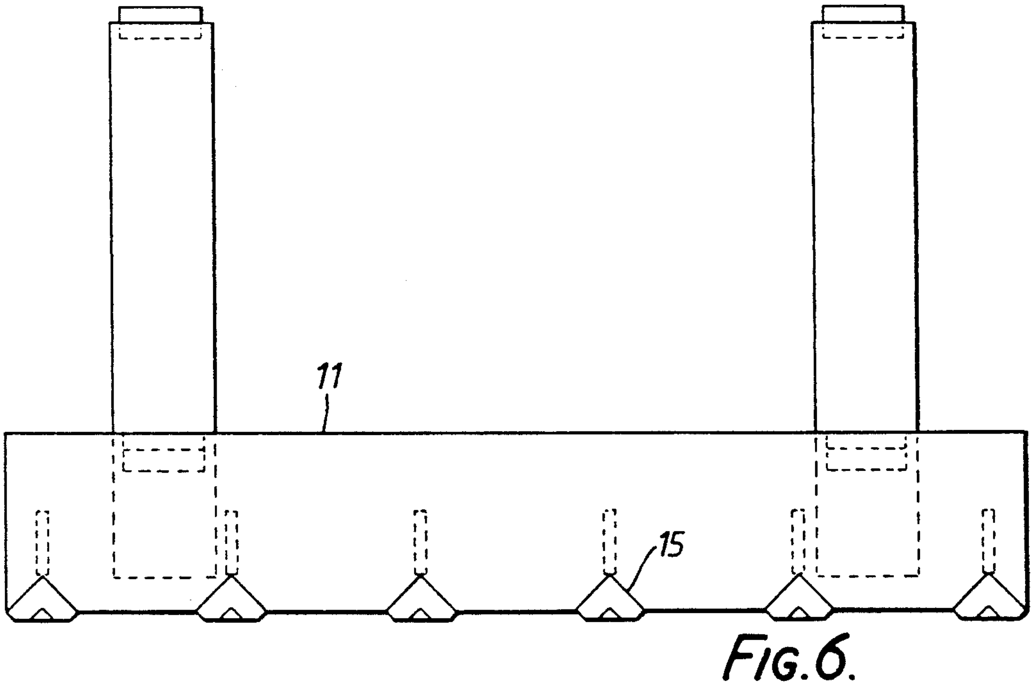
FIG. 6 is a further embodiment of a fork according to the invention.
Figure 7:
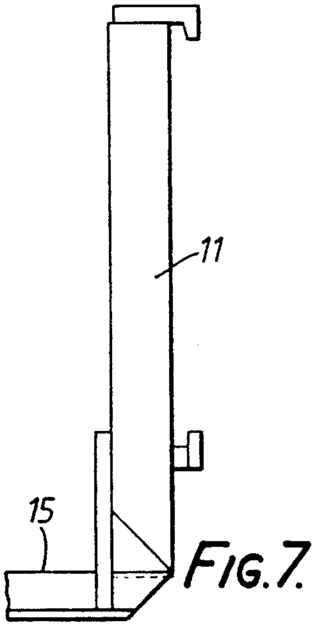
FIG. 7 is a side view of a part of FIG. 6.
Figure 8:
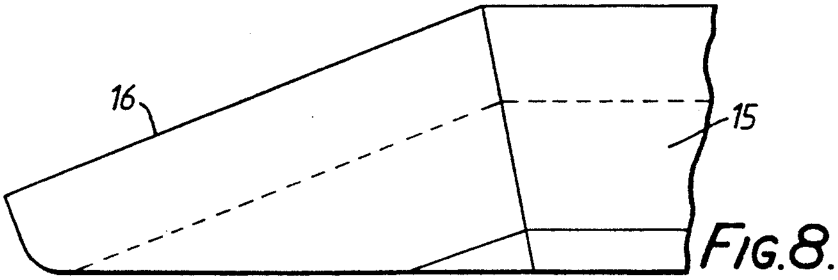
FIG. 8 illustrates on a larger scale the end of a tooth of the fork illustrated in FIGS. 6 and 7.

In the embodiment illustrated in FIGS. 6–8 teeth 15 fixed to a supporting part are shown, said teeth having a substantially triangular section, the top of the triangle being directed upwards. The front ends 16 of said teeth slope downwards towards their free ends. In some applications such triangular teeth may be preferred, in order to promote an even movement of the teeth in the spaces available between the rolled-up sods for the teeth.

I claim:

1. A method for transporting a stack of turf sod rolls comprising:

cutting and rolling up a plurality of turf sods;

laying a first layer of turf sod rolls onto a fork having at least two teeth, the longitudinal axis of the turf sod rolls being placed parallel to said teeth such that each turf sod roll is supported by two adjacent teeth of said fork;

placing a second layer of turf sod rolls on the first layer of turf sod rolls, the longitudinal axis of the turf sod rolls of the second layer being oriented transversely to the longitudinal axis of the turf sod rolls of the first layer;

placing a third layer of turf sod rolls on the second layer of turf sod rolls such that the longitudinal axis of the turf sod rolls of the third layer is oriented transversely to the longitudinal axis of the second layer of turf sod rolls but parallel to the longitudinal axis of the first layer of turf sod rolls;

retracting the fork from said turf sod rolls;

introducing a fork for transporting said turf sod rolls, said fork for transporting said turf sod rolls having teeth which are narrower than the teeth of said first fork.

2. A method for transporting a stack of sod rolls, said method comprising:

taking a fork that has a plurality of teeth that are beveled on their longitudinal sides with the teeth attached to a supporting part;

laying a first layer of sod rolls onto the fork with the longitudinal axis of the rolls placed parallel to the teeth, such that each roll is supported by two adjacent teeth;

laying a second layer of sod rolls on the first layer, the longitudinal axis of the rolls in the second layer oriented transversely to the longitudinal axis of the rolls in the first layer;

laying a third layer of sod rolls on the second layer, the longitudinal axis of the rolls in this third layer oriented transversely to the longitudinal axis of the rolls in the second layer but thereby parallel to that of the rolls in the first layer; and continuing to lay additional layers each additional layer oriented so that the longitudinal axis of the rolls in each additional layer is transverse to the longitudinal axis of the rolls in a just previously placed layer; placing a final layer on the stack; lowering the stack to a ground surface; retracting the fork from interstices formed between the sod rolls of the bottom layer; leaving the stack of sod rolls on the ground surface and further, inserting the fork into the interstices to make possible the lifting and transporting of the stack of sod rolls.

3. A method for cutting sods and transporting a stack of sod rolls, said method comprising:

taking a sod cutting machine having a fork that has a plurality of teeth that are beveled on their longitudinal sides with the teeth attached to a supporting part;

cutting sod, and forming sod rolls by means of said cutting machine;

laying a first layer of sod rolls onto the fork with the longitudinal axis of the rolls placed parallel to the teeth, such that each roll is supported by two adjacent teeth;

laying a second layer of sod rolls on the first layer, the longitudinal axis of the rolls of the second layer oriented transversely to the longitudinal axis of the rolls of the first layer;

laying a third layer of sod rolls on the second layer, the longitudinal axis of the rolls of this third layer being oriented transversely to the longitudinal axis of the rolls of the second layer but thereby parallel to that of the first layer; and continuing to lay additional layers, each additional layer oriented so that the longitudinal axis of the rolls of each additional layer is transverse to the longitudinal axis of the rolls of a just previously placed layer; placing a final layer on the stack; lowering the stack to a ground surface; retracting the fork from interstices formed between the sod rolls of the bottom layer; leaving the stack of sod rolls on the ground surface and further inserting a fork having teeth narrower than the teeth of the fork mounted on the sod cutting machine into the interstices to make possible the lifting and transporting of the stack of sod rolls.

4. A method for transporting a stack of turf sod rolls comprising the steps of:

cutting and forming a plurality of turf sod rolls;

laying a first layer of turf sod rolls onto a fork having a plurality of teeth lying spaced from each other and parallel to one another, said fork holding said first layer of turf sod rolls such that the longitudinal axis of the turf sod rolls of the first layer is parallel to the longitudinal axis of said teeth, each roll being supported by two adjacent teeth;

laying a second layer of turf sod rolls on the first layer of turf sod rolls such that the longitudinal axis of the turf sod rolls of the second layer are oriented transversely to the longitudinal axes of the turf sod rolls of the first layer;

laying a third layer of turf sod rolls on the second layer of turf sod rolls such that the longitudinal axis of the rolls of the third layer of turf sod rolls is oriented transversely to the longitudinal axis of the second roll of turf sod layers but parallel to the first layer of turf sod rolls;

continuing to lay additional layers of turf sod rolls, each additional layer being oriented such that the longitudinal axis of the turf sod rolls of each additional layer is transverse to the longitudinal axis of the turf sod rolls of a just previously placed layer;

transporting said stack of turf sod rolls by means of said fork such that said stack of rolled-up turf sod rolls is carried directly by the teeth of said fork, the lowermost layer being supported by two of said teeth which are located side by side and extend parallel to the longitudinal axis of the lowermost layer of said turf sod rolls.

* * * * *